June 30, 1931.  G. A. STACKHOUSE  1,812,611
MACHINE AND METHOD FOR ASSEMBLING SPRINGS
Filed March 5, 1930   2 Sheets-Sheet 1
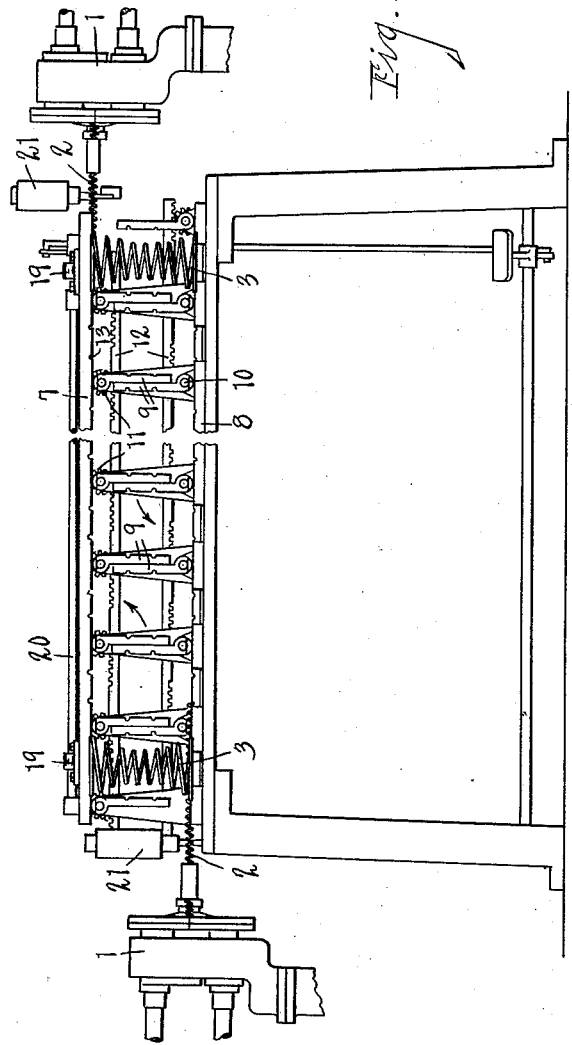
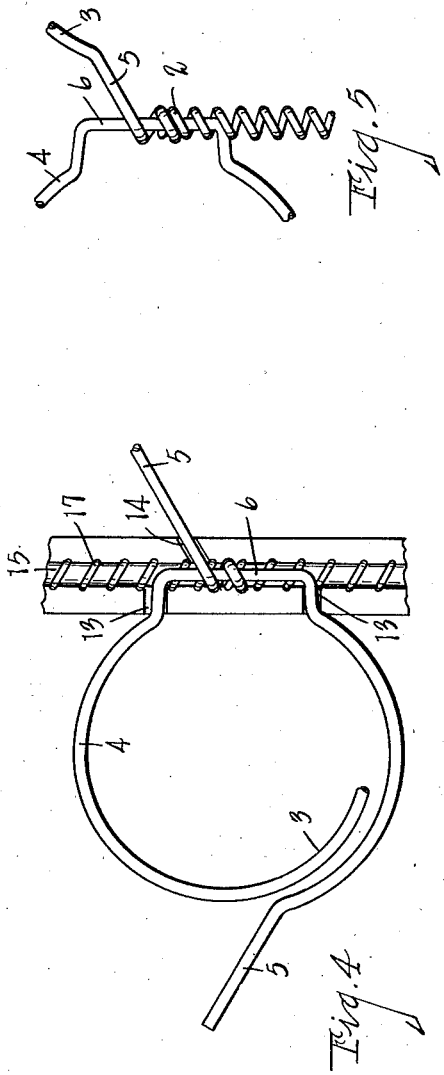
INVENTOR
George A. Stackhouse
BY
ATTORNEYS June 30, 1931.  G. A. STACKHOUSE  1,812,611
MACHINE AND METHOD FOR ASSEMBLING SPRINGS
Filed March 5, 1930  2 Sheets-Sheet 2
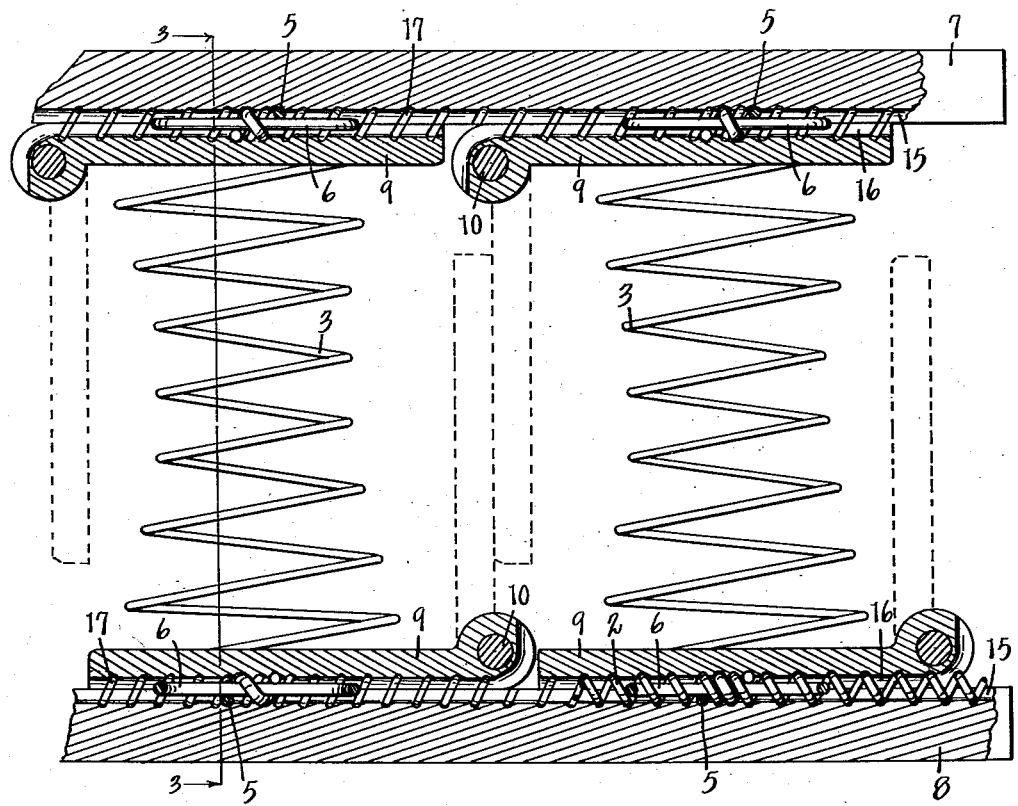
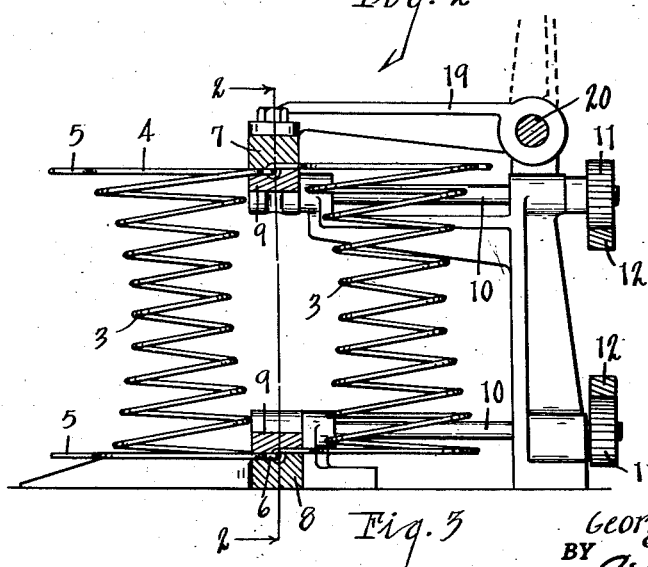
INVENTOR
George A. Stackhouse
BY Chappell Earl
ATTORNEYS Patented June 30, 1931

1,812,611

UNITED STATES PATENT OFFICE

GEORGE A. STACKHOUSE, OF OAKLAND, CALIFORNIA, ASSIGNOR TO L. A. YOUNG SPRING & WIRE CORPORATION, OF DETROIT, MICHIGAN

MACHINE AND METHOD FOR ASSEMBLING SPRINGS

Application filed March 5, 1930. Serial No. 433,245.

The main objects of this invention are:

First, to provide a machine for assembling spring structures for use as mattress fillers, cushions and the like which enables the rapid and economical assembling of body springs and helically coiled spring cross or connecting members therefor.

Second, to provide a method of assembling spring structures which may be practiced with little effort on the part of the operators and enables the very rapid assembling of the springs.

Objects pertaining to details and economies of my invention will definitely appear from the description to follow. The invention is defined in the claims.

A structure which embodies the features of my invention and illustrates the manner of carrying out the method is clearly illustrated in the accompanying drawings in which:

Fig. 1 is a fragmentary front elevation of a machine or apparatus embodying the features of my invention.

Fig. 2 is a fragmentary longitudinal section on line 2—2 of Fig. 3, the movable chuck members being shown in open or retracted position by dotted lines.

Fig. 3 is a detail section from front to rear on a line corresponding to line 3—3 of Fig. 2.

Fig. 4 is a fragmentary view illustrating the relation of the springs to each other and to the chuck.

Fig. 5 is a fragmentary view illustrating a step in the assembling of springs.

The coiling machines 1, 1 are shown mainly in conventional form and are adapted to form or produce helically coiled springs 2, these springs being formed with open coils. The springs 2 are employed as cross or connecting springs for the body springs 3.

The apparatus illustrated is designed for assembling body springs of the hour-glass type. The springs are provided with end coils 4 terminating in laterally offset tie members 5 and having offsets 6 opposite these tie members. The reaches of the offsets are preferably straight as illustrated.

The tie members 5 are spirally coiled about the reaches of these offsets, the coils of the tie members also being open so that the cross members 2 may be engaged with the reaches of the offsets 6 and between the coils of the tie members by a rotative movement thereof. The resulting structure is that of my copending application Ser. No. 433,244, filed March 5, 1930, for machine and method for assembling springs.

As the springs 2 are formed and projected by the coiling machines, they are delivered to chucks consisting of the outer chuck members 7 and 8, which extend the full length of the machine, and coacting chuck members 9 which are mounted on rockshafts 10 disposed transversely of the chuck members. These rockshafts have pinions 11 at their outer ends coacting with racks 12 so that by reciprocation of the racks the chuck members 9 are simultaneously opened and closed. The means for reciprocating the racks are not illustrated.

The chucks have openings 13 and 14 therein to receive the body springs and longitudinal coacting channels 15 and 16 to receive and guide the cross springs 2. These channels have spiral grooves 17 for the cross members, guiding the same into engagement with the portions of the springs lying within the chuck, and also serving to lead or advance the cross member as it is rotated and projected from the coiling machine.

The upper chuck member 7 is mounted on arms 19 carried by the rockshaft 20 so that it may be swung upwardly to facilitate the arrangement of the springs in position to be engaged by the chucks.

The chuck members 9 are pivotally supported so that they may be swung to upright position as shown in Fig. 2 to facilitate the arrangement of the springs to be connected in the machine.

21 represents cutters for cutting off the coiled spring cross members after they are projected by the coiling machine.

While it is very practical to assemble these springs as they are formed, it is also practical to form them separately and feed them into the assembling machine by other means.

I have not attempted to illustrate or describe various modifications and adaptations which I contemplate as it is believed that this disclosure will enable those skilled in the art to embody or adapt my improvements as may be desired.

Having thus described my invention what I claim as new and desire to secure by Letters Patent is:

1. The method of assembling helical springs having end coils terminating in laterally disposed tie members and having offsets in such end coils opposite the tie members consisting of wrapping the tie members about the offsets of adjacent springs in open spiral coils, disposing the offsets of the connected springs in a chuck with the reaches of their offsets in alined relation, the chucks having spiral grooves therein, and rotating and advancing a spiral spring cross member in said chuck whereby it is engaged with the said offsets, the coils of the time member being spaced to receive the coils of the cross member between them.

2. The method of assembling helical springs having end coils terminating in tie members and having offsets in such end coils opposite such tie members consisting of wrapping the tie members about the offsets of adjacent springs, disposing the connected springs in a chuck whereby the reaches of the offsets are supported in alinement within the chuck, the chuck having spiral grooves therein, and rotating and advancing a spiral spring cross member in the said chuck whereby it is engaged with the said offsets.

3. The method of assembling helical springs having end coils terminating in laterally disposed tie members and having offsets in such end coils opposite such tie members consisting of wrapping the tie members about the offsets of adjacent springs, disposing the connected springs in a chuck, and rotating and advancing a spiral spring cross member in said chuck whereby it is engaged with the offsets of the springs and the coils of the tie members.

4. In a spring assembling machine, the combination of chucks adapted to receive a plurality of connected spaced pairs of springs, one spring of each pair having an offset therein and the other a tie member spirally wound about said offsets, said chucks comprising outer chuck members having longitudinal channels therein, and a plurality of coacting chuck members pivotally mounted between said outer chuck members to swing to a transverse position between said outer chuck members, said chucks being spirally grooved and adapted to receive and guide a helically coiled spring cross member rotated and advanced therein into engagement with the offset portions and tie members of said body springs within the chuck.

5. In a spring assembling machine, the combination of chucks adapted to receive a plurality of connected spaced pairs of springs, one spring of each pair having an offset therein and the other a tie member spirally wound about said offsets, said chucks comprising outer chuck members having longitudinal channels therein, and a plurality of coacting chuck members pivotally mounted between said outer chuck members to swing to a transverse position between said outer chuck members, said chucks being adapted to receive and guide a helically coiled spring cross member rotated and advanced therein into engagement with the offset portions and tie members of said body springs within the chuck.

6. In a spring assembling machine, the combination of a chuck adapted to receive the connection portions of a plurality of connected pairs of body springs, said chuck comprising a chuck member having a longitudinal channel therein, a plurality of coacting chuck members, and pivots on which are mounted said chuck members disposed transversely of said first mentioned chuck member so that the pivoted chuck members may be swung to a position transverse thereto permitting the positioning and removal of the springs to be connected, said chucks being spirally grooved and adapted to receive and guide a helically coiled spring cross member rotated and advanced therein into engagement with portions of the body springs within the chuck.

7. In a spring assembling machine, the combination of a chuck adapted to receive the connecting portions of a plurality of connected pairs of body springs, said chuck comprising a chuck member having a longitudinal channel therein, a plurality of coacting chuck members, and pivots on which are mounted said chuck members disposed transversely of said first mentioned chuck member so that the pivoted chuck members may be swung to a position transverse thereto permitting the positioning and removal of the springs to be connected, said chucks being adapted to receive and guide a helically coiled spring cross member rotated and advanced therein into engagement with portions of the body springs within the chuck In witness whereof I have hereunto set my hand.

GEORGE A. STACKHOUSE.